July 19, 1932. P. GELINSKI 1,868,009
SCREW HOLDING SCREW DRIVER
Filed Jan. 2, 1932
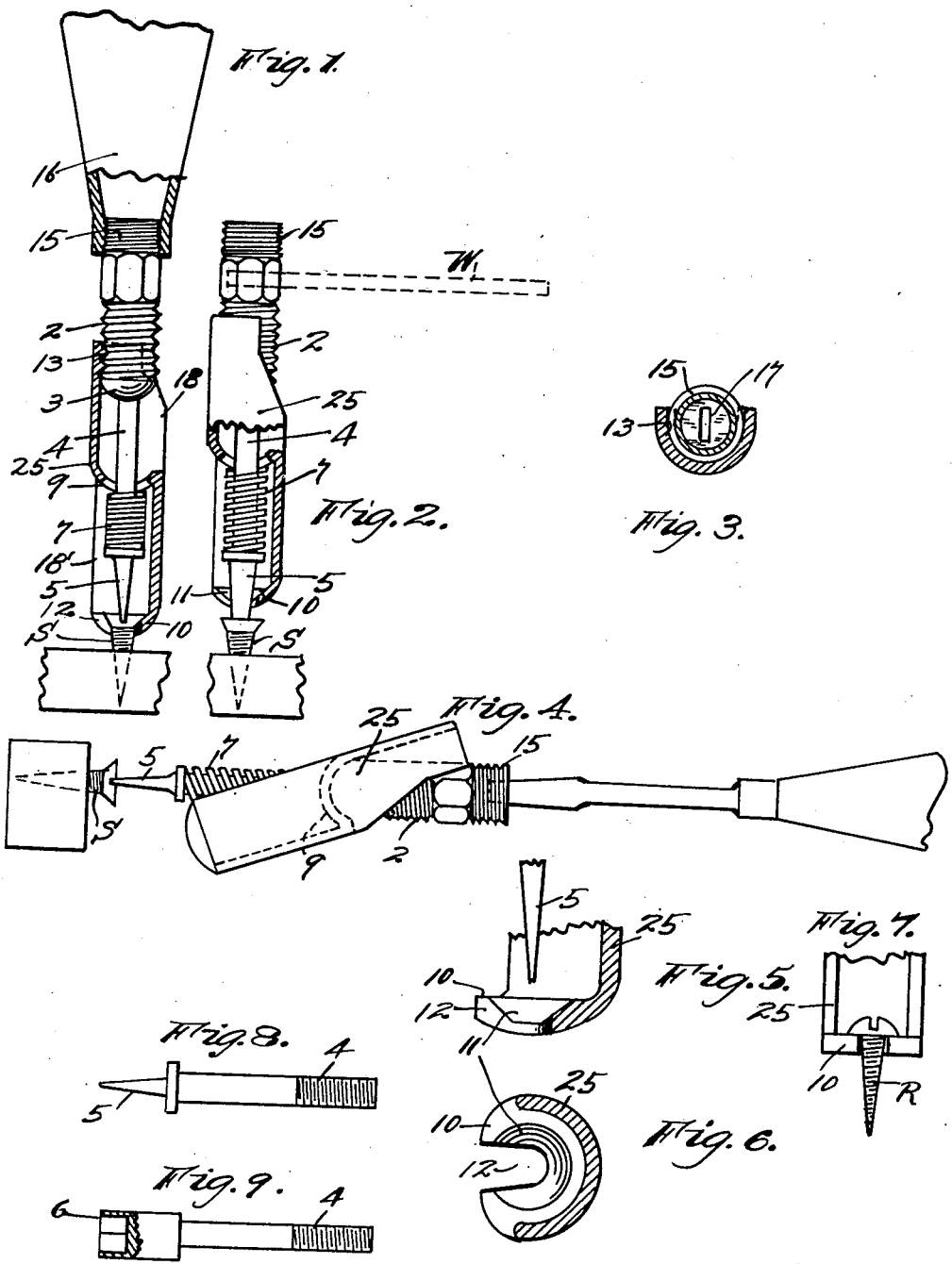
INVENTOR,
P. Gelinski;
BY F. E. Maynard
ATTORNEY.

Patented July 19, 1932

1,868,009

UNITED STATES PATENT OFFICE

PAUL GELINSKI, OF PASADENA, CALIFORNIA

SCREW HOLDING SCREW-DRIVER

Application filed January 2, 1932. Serial No. 584,491.

This invention relates to hand tools and more especially to screw drivers.

An object is to provide a combined screw holder and screw driver. A further object is to provide a screw-seat shell having a lock-up relation and also a knuckle-action as to a mandrel or drive body.

An additional object is to provide a screw-holder and mandrel capable of receiving a box-handle or the nib of a screw-driver of ordinary form, or the application of a conventional wrench.

A desideratum is to provide for the use of the tool upon screws of various sizes and kinds.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is an axial section of the tool with a locked-in screw ready to drive.

Figure 2 is a sectional, side elevation of the tool as adjusted for driving a started screw.

Figure 3 is a cross-section through the mandrel as set in its jamb-nut.

Figure 4 is a side elevation showing the holder shell tilted back out of the way.

Figure 5 is a detail section of the shell, screw-head seat.

Figure 6 is a plan of the seat, and section across the shell.

Figure 7 is a front view of a bench or seat part for a "round-head" screw.

Figure 8 is a side view of a detached mandrel nib for wood screws.

Figure 9 shows a bolt-head, socket nib for the mandrel.

The tool comprises a mandrel body having a screw shank 2 with a ball end 3 into which is screwed the stem 4 of one or another form of screw driving members 5 or 6, as shown in Figs. 8 and 9.

Surrounding the mounted stem 4 is an expansion spring 7, one end of which seats on a transverse wall 9 in a shell 25 which includes, at one end, a transverse seat or bench 10. A form of this bench is shown in Fig. 5 and in Fig. 6 as having a countersunk seat 11 having a lateral entry throat 12 of V-shape to receive the neck of a wood screw S.

In Fig. 9 is shown a bolt-head socket 6 for driving polygonal screw or bolt. In Fig. 7, the bench 10 has a flat top surface for use with round head screws R.

Figs. 1 and 3 show the upper end of the mandrel shell as having a half-nut 13 whose threads are complementary to threaded part 2 of the mandrel, which also has an intermediate non-circular part for application of a wrench W (shown in dotted lines) Fig. 2, and above this the mandrel has a threaded end 15 to receive a hollow handle 16 in which may be stored the interchangeable tool nibs 5—6, and other objects.

The upper end of the mandrel has a tool slot or socket 17 to receive a driving tool, as in Fig. 4, if the handle 16 is not employed.

In Fig. 1, a wood screw S has been placed in the seat 11 and the screw-body 2 has been run down the half-nut 13 so that the driver nib 5 is clinching the screw S to the seat 11. In this lock-up of the parts it is possible to point the tool in any direction and by direct axial pressure on the tool the screw is very easily started; even at an oblique angle into the structure against which it is pressed. By rotation of the tool as a whole, the screw is readily run in. Then the shell is tipped over on the stem 4 of the mandrel, Fig. 4, to disengage it from the half-nut 13; the shell being open at top and bottom sides which are diagonally opposite, as shown in Fig. 1 at 18 and 18'. When so knuckled over, the spring 7 pushes the shell wall 9 outward on the stem 4 until the wall 9 stops against the ball-end 3 of the mandrel. In this position, the shell is out of the way and clearly exposes the screw being driven in.

In Fig. 2, the shell has been shifted back up the mandrel screw 2 so as to project the nib 5 below the bench 10 and thus allow the screw S to be run in fully without tilting off the shell, as in Fig. 4.

Obviously, several sizes of screws may be set in the bench seat 11, and this, being on the axis of the tool, automatically brings the applied screw S to the center.

What is claimed is:

1. A combined screw-holder and driver comprising a shell having a bench end with a screw-head seat, and a driving mandrel tiltably mounted in the shell and having a nib to engage and drive an introduced screw.

2. A combined screw-holder and driver comprising a shell having a bench end with a screw-head seat, and a driving mandrel tiltably mounted in the shell and having a nib to engage and drive an introduced screw, and a spring for pushing the shell back on the mandrel when this is tipped outward on the mandrel.

3. A combined screw-holder and driver comprising a shell having a bench end with a screw-head seat, and a driving mandrel tiltably mounted in the shell and having a nib to engage and drive an introduced screw, and said shell and mandrel having mutual screw-threaded parts whereby the nib may be screwed to lock-up position on the screw in said seat.

4. A combined screw-holder and driver comprising a shell having a bench end with a screw-head seat, and a driving mandrel tiltably mounted in the shell and having a nib to engage and drive an introduced screw, and a spring for pushing the shell back on the mandrel when this is tipped outward on the mandrel; said shell having a half-nut to and from which the mandrel is tiltable and is held in different positions of adjustment as to the shell and against action of the spring.

5. A screw driver mandrel having a threaded part for application of a driver handle, a socket for insertion of a screw driver nib, and a non-circular part for application of a wrench; whereby the mandrel may be turned by either of the applied instruments named.

PAUL GELINSKI.